United States Patent [19]
Inhofer

[11] Patent Number: 4,465,089
[45] Date of Patent: Aug. 14, 1984

[54] FLOW DIVIDER AND COMBINER FOR TRACTION CIRCUITS

[75] Inventor: Harold Inhofer, Hopkins

[73] Assignee: Mag-Dynamics, Inc., Ottumwa, Iowa

[21] Appl. No.: 426,698

[22] Filed: Sep. 29, 1982

[51] Int. Cl.³ ............................................. G05D 11/03
[52] U.S. Cl. .................................... 137/101; 137/111; 137/118
[58] Field of Search ................. 137/98, 100, 101, 111, 137/118

[56] References Cited

U.S. PATENT DOCUMENTS

| | | | |
|---|---|---|---|
| 2,956,577 | 10/1960 | Kirkham | 137/101 |
| 4,121,601 | 10/1978 | Presley | 137/101 |
| 4,325,400 | 4/1982 | Wynne | 137/101 |
| 4,402,336 | 9/1983 | Kalmanczhelyi | 137/101 |

Primary Examiner—Robert G. Nilson
Attorney, Agent, or Firm—James R. Cwayna

[57] ABSTRACT

A flow divider and combiner for delivering and receiving fluid under pressure to and from independent motors which are linked together for operation by an external force. The unit includes sliding flow control spools and relief valves operable within an orifice to provide a variable orifice for the control of flow with regard to pressure differentials. Through selection of the relief valve shapes and structures, the unit can be programmed for differential pressures existing between the inlet or outlet portions of the device and the differential pressures associated with the chambers connected to the independent motors versus the flow volume to the motors. This structure provides for a high degree of control at relatively low pressures and volume flow where such control is critical to proper operation and allows for less control and pressure loss at higher speed where such control is less critical to proper operation.

6 Claims, 9 Drawing Figures

FLOW DIVIDER AND COMBINER FOR TRACTION CIRCUITS

FIELD OF THE INVENTION

This invention relates generally to flow dividing and combining mechanisms and more specifically to flow dividing and combining mechanisms for the operation of independent motors which are tied together in their functions through an external source and which includes a variable orifice with capabilities to program the variable orifice with regard to pressure differential versus flow volume.

BRIEF DESCRIPTION OF THE INVENTION

A control member for the dividing or combining of fluid flow to and from independent motors which motors are joined through an external force. A specific example of such a unit is a two wheeled fluid driven unit wherein the external force is the ground over which the vehicle travels. The traction due to the existing surface conditions may result in the "spin-out" of one of the wheels and this control member will automatically compensate for such conditions by metering or reducing the flow to the "spin-out" wheel until the other wheel attains the driving speed for proper operation of the unit.

The applicant's concept includes a control spool for delivering fluid to each of the wheel motors with the flow to the spool controlled outlet or inlet being obtained with a variable orifice which is pressure responsive and which is also flow volume responsive.

The unit then includes a distributor housing having an inlet and a pair of outlets, the same being reversed in their operation when the wheels are to be driven in a reverse direction, a pair of control spools for controlling flow and metering flow to and from the outlets and a pair of orifice structures which includes a relief valve member moveable within the orifice portion or opening to control the fluid flow therethrough and thus the fluid flow through and past the spool members to the driven motors.

With the applicant's concept, the relief valves may be selected or programmed to provide control of the motors in selected percentages of the flow rates. In other words the unit may be programmed for operation at predetermined differential pressures versus flow volumes to allow and provide for motor control over the lower fifty percent of potential flow volume of the circuit. The applicant has found that control over this lower fifty percent of potential is of more import than control over the upper fifty percent of the potential flow volume of the circuit.

BACKGROUND AND OBJECTS OF THE INVENTION

The applicant is well skilled in the knowledge of hydraulic fluid flow control equipment. The unit as illustrated herein includes various components that are well known in the prior art. Such components include spool valves, relief valves, metering orifices and the like. After reviewing the appropriate prior art, it is the applicant's considered opinion that the art does not include a variable orifice arrangement which allows for the programming of differential pressures occurring between the inlet of the unit and the control chambers which allow ultimate delivery of fluid to the motors to be driven versus the flow volume to the motors. This can in no manner be accomplished through the use of a fixed orifice unit.

A fixed orifice unit will result in low pressure differentials at low flow and therefore limited control for the driving or driven motors and will result in high pressure differentials at high flow volume which provides precise control. It is at these lower flow volumes and low pressure differentials that control becomes essential. An example of required control is a two wheeled vehicle with one wheel positioned in sand or low traction medium with the other wheel being on a high traction medium. With the applicant's unit, a variable orifice flow control is provided and this orifice is programmable to greater differential pressures versus flow differentials at low flow and therefore control at low flow, and, similarly lower pressure diffentials at high flow resulting in less control and less pressure loss at higher vehicle speeds.

The variable orifice structure of the applicant's device is actually a sliding poppet or low pressure relief valve. The particular poppet design determines and changes the differential pressure changes versus the flow volume changes. Differential pressure variations between the two wheel or motor circuits result in control spool shift and resulting control and this design allows a greater acceptable flow increase from a "beginning control" flow.

In accordance with the background of the invention, it is therefore an object of the applicant's invention to provide a flow divider or combining device including control spools for the ultimate delivery of or receipt of hydraulic fluid to and from independent motors which are joined by an external force.

It is a further object of the applicant's invention to provide a flow divider or combining device which includes a variable orifice structure for the control of fluid flowing through the unit to at least two independent motors such control being in response to pressure losses and pressure differentials across the orifices.

It is still a further object of the applicant's invention to provide a flow divider or combining device which includes a variable orifice structure having a poppet, relief valve mounted for shiftable movement within the opening of the orifice.

It is still a further object of the applicant's invention to provide a flow divider or combining structure which includes a variable orifice structure having a poppet, relief valve mounted for shiftable movement within the opening of the orifice and which allows, through a selected shaping of the poppet, relief valve, a programmable relationship between the differential pressures occurring through the circuit and the flow volumes thereof.

These and other advantages of the applicant's invention will more fully appear from a consideration of the accompanying description which incorporates the included drawings.

DESCRIPTION OF A PREFERRED FORM OF THE INVENTION

Figure 1:
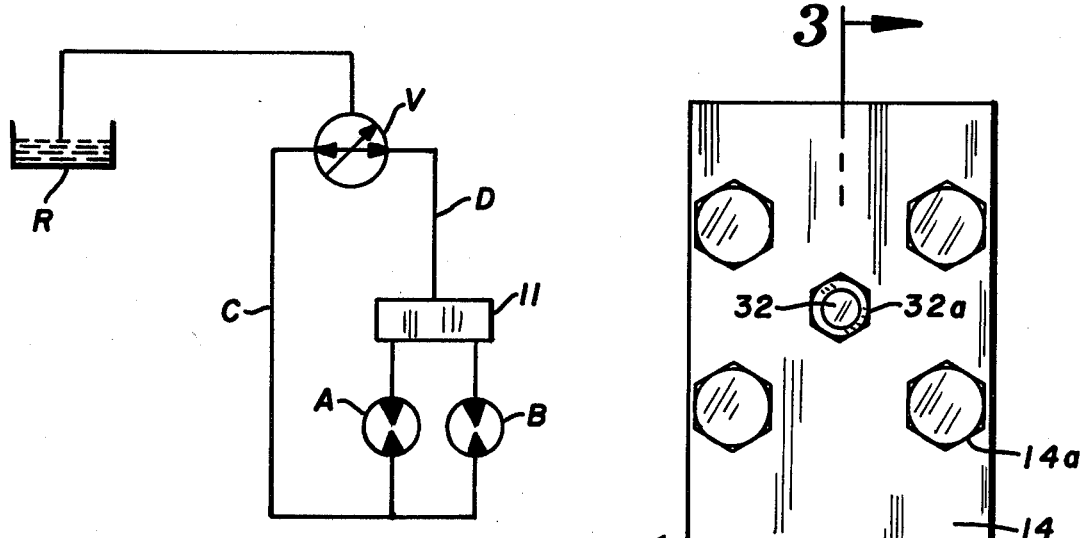
FIG. 1 is a schematic illustration of a circuit for driving a pair of independent motors through the utilization of a flow divider and combiner which incorporates the concepts of the applicant's invention.
Figure 2:
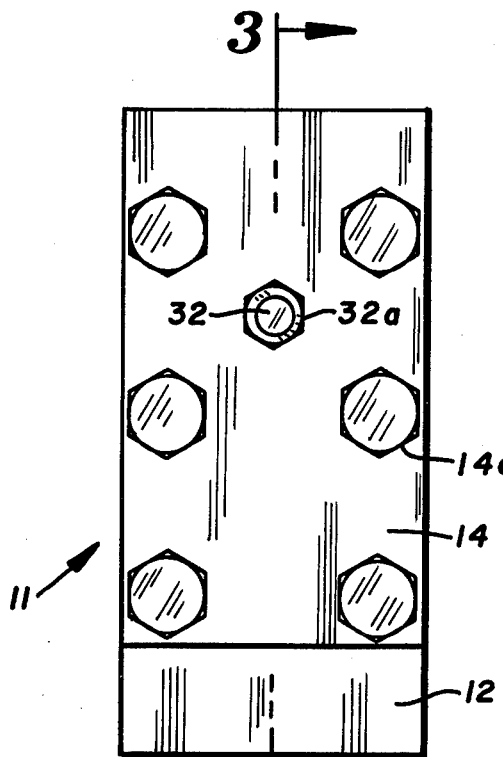
FIG. 2 is an end view of the divider and combiner embodying the concepts of the applicant's invention.

In accordance with the accompanying drawings, the flow divider and combiner is generally designated 11 and is illustrated in a typical circuit in FIG. 1. In this circuit, the device 11 is positioned to deliver fluid to or receive fluid from a pair of independent motors which may be attached for driving two independent wheels of a fluidly driven vehicle. The motors are designated A, B. The circuit will normally include a reservoir R and what may be identified as a four-way valve or pump V. Obviously the circuitry must include a pressure means and therefore a pump device will, of necessity be included. Lines C and D are provided for the distribution of fluid to both sides of the motors A, B for forward and reverse driving thereof.

The divider and combiner 11 includes, in the form shown, a three part unit which includes a central block 12 and a pair of closure housings 13, 14 arranged on the respective ends of the block 12. The closure housings 13, 14 are held to the block 12 through a plurality of attachment bolts 13a, 14a or the like and it should be obvious that the housings 13, 14 must be sealingly connected to the block 12.

The central block provides an opening, serving either as an inlet or outlet, depending upon the direction of rotation desired, such opening being designated 15, arranged on one edge 12a of the block and a pair of openings 16, 17 on an opposite edge 12b of the block. This pair of openings 16, 17 serve as inlets or outlets to the driven motors A, B, dependent upon the direction of rotation of the same.

A first, orifice, poppet valve passage 18 is defined within the block 12 and this passage extends from one end 12c of the block 12 to the other end 12d thereof. A second, spool valve passage 19 is spaced from said first passage and again extends from one end 12c of the block to the other end 12d thereof. As illustrated, the housings 13, 14 are provided with closed end passages 19a, 19b which are in alignment with the spool passage 19.

A communication passage 15a extends from the opening 15 between the orifice passage 18 and the spool passage 19.

A first pair of communication passages 20, 21 extend from the orifice passage 18 to the spool passage 19 and these passages 20, 21 are spaced outwardly from passage 15a.

As also illustrated, communication passages 16a, 17a are provided for communication between spool passage 19 and the openings 16, 17.

A second pair of communication passages 22, 23 are provided to extend from the orifice passage 18 to the areas defined by the housings 13, 14, such areas being previously designated 19a, 19b for the introduction of fluid under orifice passage pressure to the areas behind the respective spools as will be described hereinafter.

In the form shown, orifice defining inserts 24, 25 are provided in opposite ends of the orifice passage 18 and these inserts are arranged to extend inwardly from the ends 12c, 12d of the block 12 and are provided with an inwardly directed, orifice forming shoulder 24a, 25a at the innermost ends thereof. In the form shown, the inwardly directed shoulders 24a, 25a are of a triangular shape.

The poppet relief valves are mounted within the orifice passage 18 and, in the form shown a pair of mounting rods 31, 32 are provided in and carried by housings 13, 14 with the valve members 33, 34 being slidably mounted thereon in close association with the orifice forming shoulders 24a, 25a of inserts 24, 25. As illustrated, selected portions of the rods 31, 32 are threaded and the housings 13, 14 are similarly threaded to receive the same. Lock nuts 31a, 32a are provided to lock the rods in position.

As stated, the valve members 33, 34 are positioned between adjustment members 35a, 35b, 36a, 36b which adjustment members are arranged on threaded portions of the rods 31, 32 and spring members 37a, 37b, 38a, 38b are interposed between such adjustment members and the valve members. With this construction, initial positioning of the valve members 33, 34 is obtainable and shifting of the valve members 33, 34 is permitted in response to the pressures existing on either side thereof. This sliding action provides the variability of the orifice and it should be obvious that the movement of the valve members will be in the direction of the lower differential pressure.

Arranged within the spool valve passage 19 is a spool valve assembly generally designated 40. This assembly includes a first control rod 41 upon which a pair of spool valves 42, 43 are slidingly arranged. Each of the spool valves includes three sections which are defined as, for purposes of this description, a first control portion 42a, 43a, a reduced fluid passing portion 42b, 43b and a second control portion 42c, 43c. It should be noted that the first and second control portions 42a, 43a and 42c, 43c form a sliding seal within the spool passage and are positioned to respectively act over and open and substantially close the aforementioned flow and interconnecting passages 16a, 17a and 20, 21. Stop pins 44a, 44b are provided on the control rod 41 to limit the outward travel of the spools 42, 43 and when the spools 42, 43 are in their outermost positions, as illustrated in FIG. 3, a gap will be provided between the second portions 42c, 43c thereof, which gap will be in substantial alignment with the interconnecting passage 15a such that inlet pressure may act between the spools 42, 43.

Figure 4:
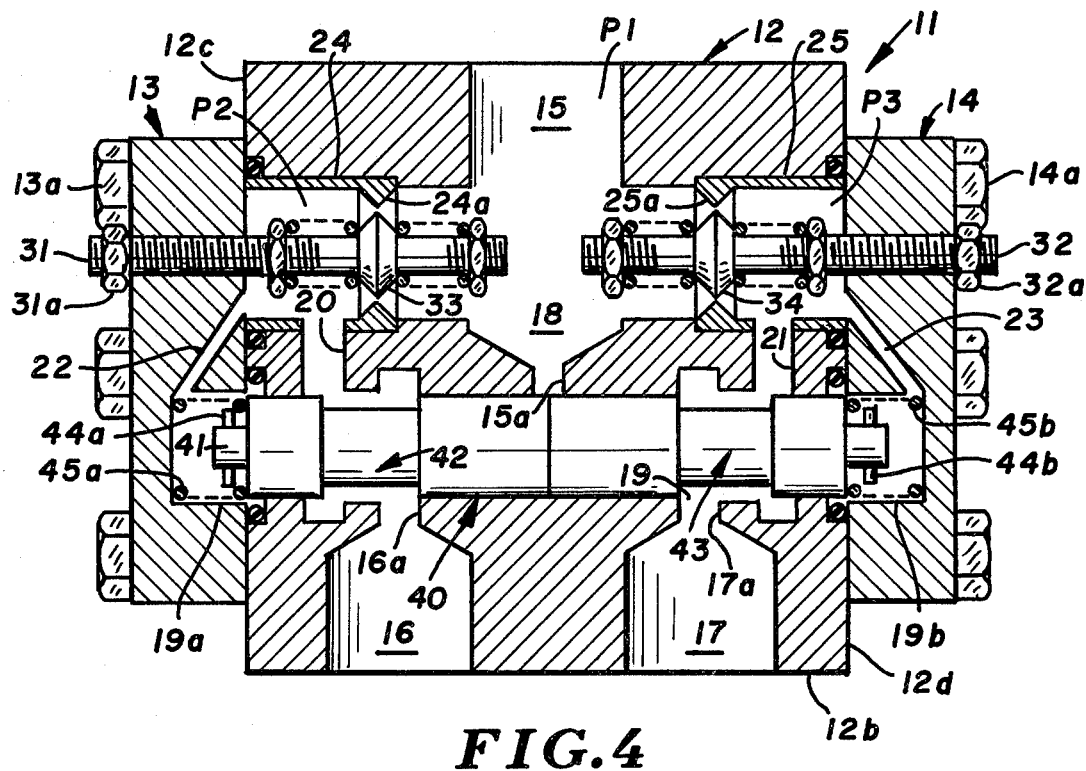
FIG. 4 is a vertical section taken substantially along Line 3—3 of FIG. 2 and showing the applicant's device in a flow combining position with equal flow being received from the independent motors, the motors being run in a direction opposite to the direction of rotation as compared to FIG. 2.

A pair of compression springs 45c, 45b are respectively arranged in the aforementioned housing cavities 19a, 19b to abut with the first portions 42a, 43a of the spools 42, 43 and the purpose of such spring members is to, when the unit is not in operation, return the spools to the position shown in FIG. 4. This may be termed a non-active or dead condition.

For the purposes of discussion of the operation of the unit three different pressure areas exist. The first is designated P1 which is the pressure within the passage 15 which therefore will be the pressure presented against one side of the poppet relief valves 33, 34 and against the second portions 42c, 43c of the spool valves 42, 43. The second such area is designated P2 and is the pressure of motor A and the existing pressure in passages 16 and 20, the area defined on the opposite or second side of poppet relief valve 33 and passage 22 to thereby act against the outermost end of the first portion 42a of the spool 42. The third such area is designated P3 and is the pressure of motor B and the existing pressure in passages 17 and 21, the area defined on the opposite or second side of poppet relief valve 34 and passage 23 to thereby act against the outermost end of the first portion 43a of the spool 43.

Figure 3:
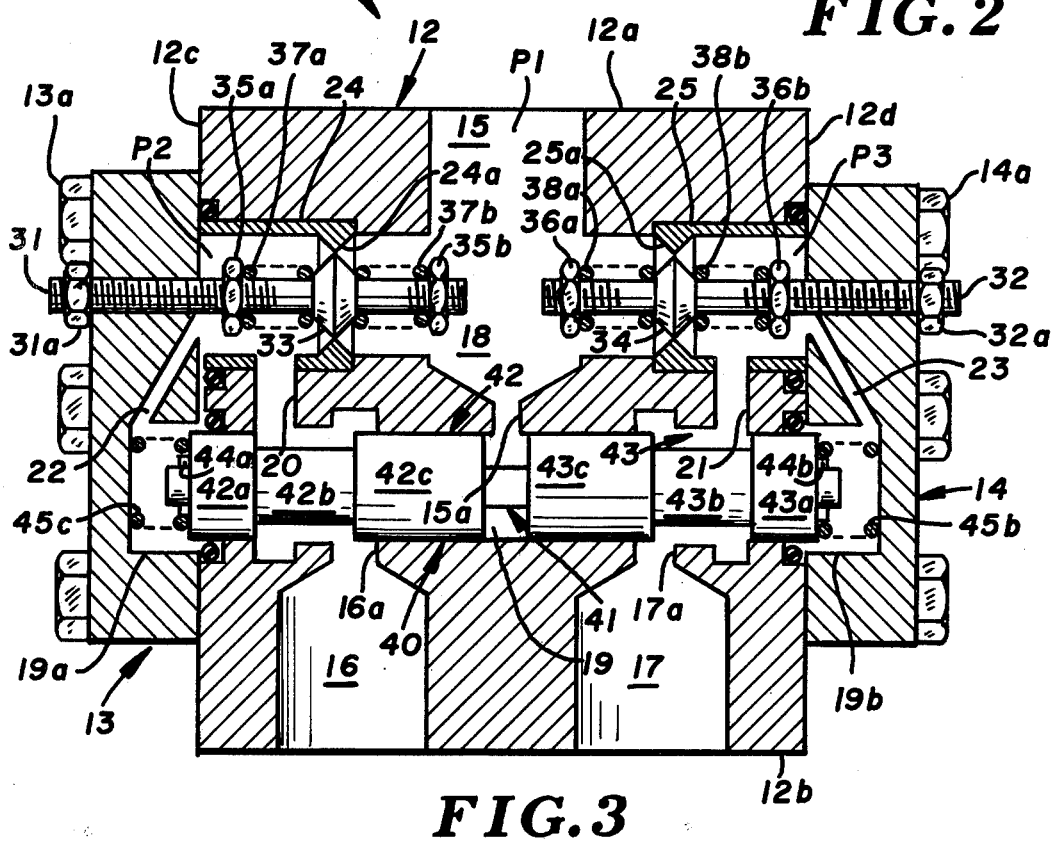
FIG. 3 is a vertical section taken substantially along Line 3—3 of FIG. 2 and showing the applicant's device in a flow dividing position with equal flow being delivered to the independent motors.

In the condition as illustrated in FIG. 3, it may be assumed that the motors A and B are being driven in a forward motion direction and the wheels attached to and driven by the motors are being driven at equal speed. Under such conditions, P1 is greater than P2 or P3 and also that P2 is equal to P3; further, the flow volume to each of the motors and attached wheels is being divided equally. In order to obtain the condition as illustrated in FIG. 3, prior to providing the fluid under pressure, the spool members 42, 43 were positioned as illustrated in FIG. 4 in which the spool members were in the nonactive or dead condition. Upon the introduction of fluid under pressure the spools 42, 43 are separated into the position of FIG. 3 due to the action of fluid delivered into the spool passage 19 through communication passage 15a.

Although previously not stated, it should be obvious that the poppet valves are of a size to permit flow through the defined orifice areas defined by the inwardly directed shoulders 24a, 25a of the orifice inserts. In effect, it may be stated that in such an equal flow condition a fixed orifice is provided.

It should also be obvious that the wheels being driven by the motors are connected by an external force which is the terrain over which the vehicle is traveling.

Should, for example, the left wheel of the vehicle, as connected to passage 16, "spin out" due to the traction offered by the terrain the P2 will drop and the flow will be initially directed to this wheel. This is caused by movement of poppet valve 33 to the left permitting additional flow through passage 16. Upon occurrance of this pressure drop, the spool valve 42 will also be moved to the left and the second section 42c of the spool valve will meter the flow through passage 16. Simultaneously, pressure, P3, will increase to approach P1 and poppet relief valve 34 will shift to the left to permit more flow to passage 17 and the right wheel wheel of the vehicle to thereby provide an increased rotative force to the motor and attached wheel. As the flow through passage 16 is decreased due to the metering thereof, P2 will increase to decrease the flow through the orifice, poppet relief valve combination. As the speed of the motor fed by passage 17 increases, P3 will decrease and poppet relief valve 34 will move to the right to decrease the flow through the orifice valve combination. This action will continue until the equilibrium condition is obtained.

Obviously the opposite set of actions will result if the right wheel and motor combination is presented with a traction surface that will result in "spin out" conditions.

Figure 5:
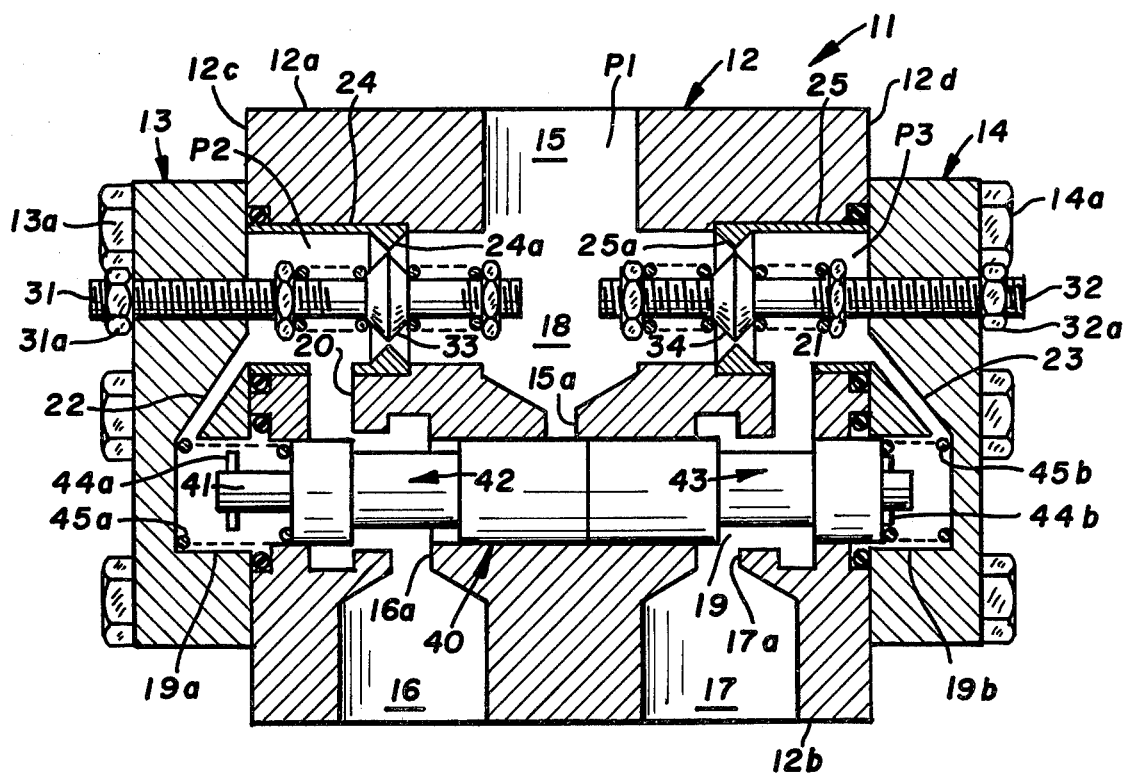
FIG. 5 is a vertical section taken substantially along Line 3—3 of FIG. 2 and substantially identical to FIG. 4 in the structure thereof but illustrating a condition wherein one motor is being driven in a "spin-out" condition.

The operation of the unit as a flow combiner is illustrated in FIGS. 4 and 5. In this condition, the flow is directed by the four way valve and pump combination of the circuit to reverse the directions of rotation of the motors and attached wheels.

The unit is illustrated in an equal flow condition in FIG. 4 and in a condition of wheel "spin out" in FIG. 5. In FIG. 5, the wheel connected to passage 16 "spins out" and in this condition, P2 is greater than P3 and similarly, P2 is greater than P1. Such a condition results in shifting of the spool 42 to the right where the first section 42a of the spool will be brought into metering relation to passage 16. At this high flow condition, the popper relief valve 33 will be shifted to the right and upon the occurance of such metering, P2 will decrease to allow such poppet relief valve to return to the left. Simultaneously with such metering, the flow to passage 17 will increase and greater power will be transferred to such controlled wheel until the same is brought up to the equilibrium speed at which point the spool valve members 42, 43 and the poppet relief valve members 33, 34 will return to the positions as illustrated in FIG. 4.

Basically the operation of the spool valves and poppet relief valves is identical for either the division or combination of flow and the important aspect of the invention is the action of the poppet relief valves to provide the variable orifice effect.

Figure 6:
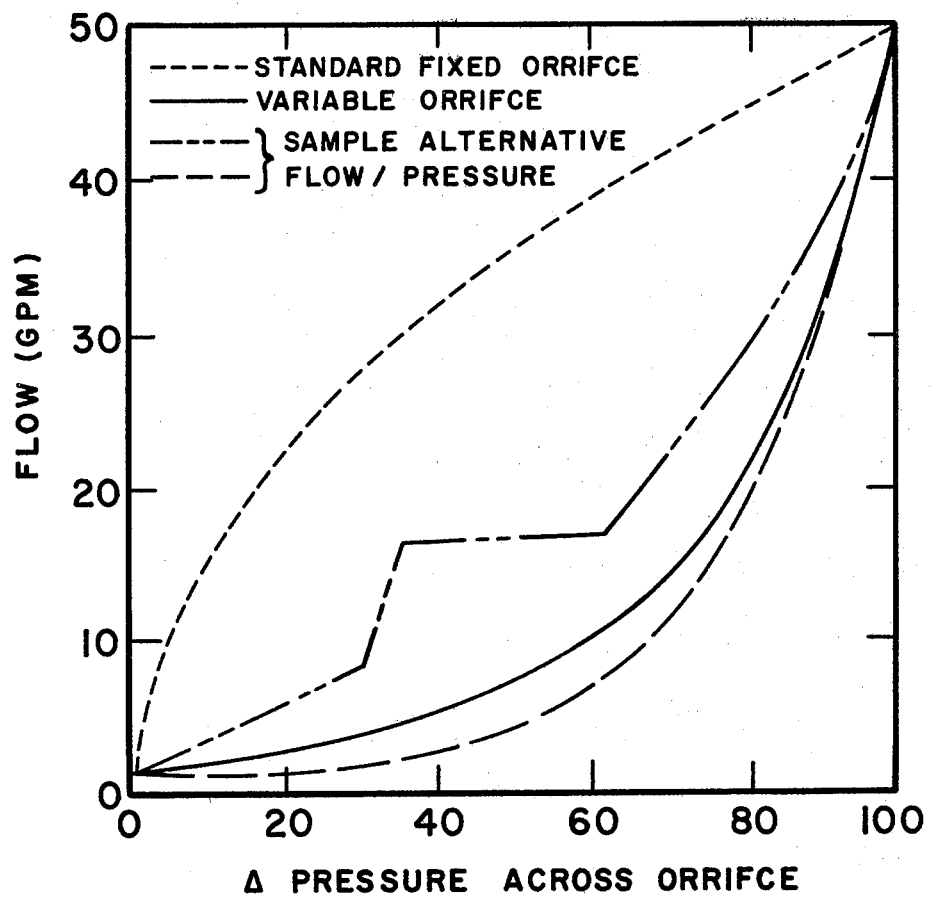
FIG. 6 is a graphical representation of differential pressure versus flow volume (gpm) and plotting the characteristics for a fixed orifice and three variable orifices as considered by the applicant.
Figure 7:
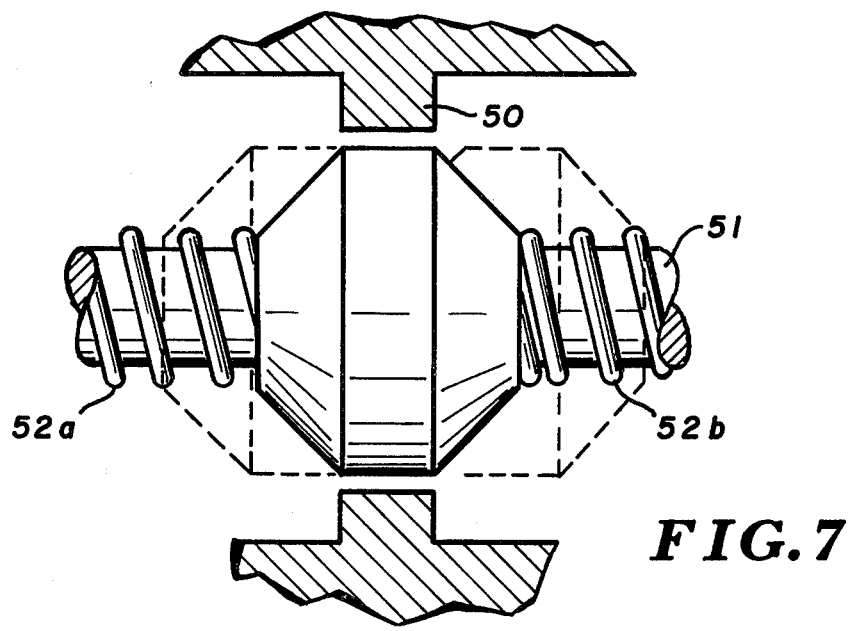
FIG. 7 is a view, drawn to an enlarged scale of a typical, programmed poppet, relief valve which may be incorporated in the applicant's device and whose characteristics are plotted on the graph of FIG. 6.
Figure 8:
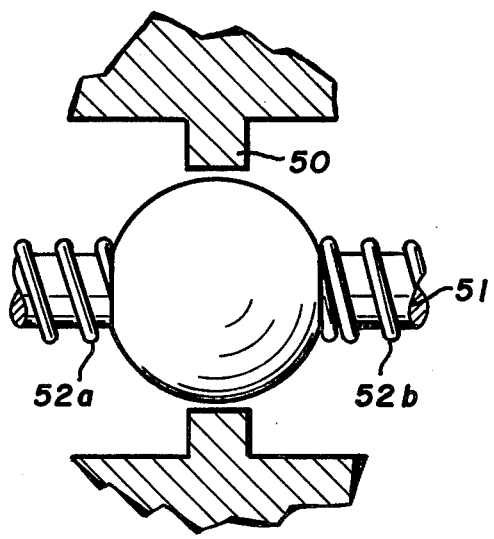
FIG. 8 illustrates a further, programmed poppet, relief valve considered by the applicant and which is graphically portrayed on FIG. 6; and, FIG. 9 is yet another illustration of a programmed poppet valve considered by the applicant and, againg being graphically portrayed on FIG. 6.
Figure 9:
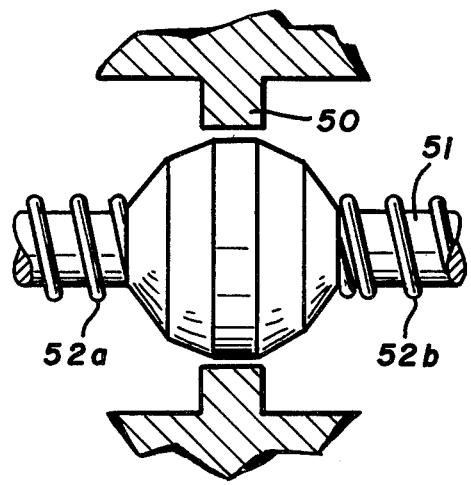

A comparison of control features with a standard, fixed orifice and variable orifices is illustrated graphically in FIG. 6 and FIG. 6 is correlative to the various poppet relief valve configurations as illustrated in FIGS. 7, 8 and 9.

It should be noted in FIGS. 7, 8 and 9 that the orifice defining member 50 is similarly modified from the angular configuration illustrated in FIGS. 3, 4 and 5.

FIGS. 7, 8 and 9 are only illustrative of various forms of programmed poppet relief valves that may be utilized and, as illustrated in FIG. 6, the respective differential pressures on opposite sides of the poppet relief valves is represented versus the flow in gpm.

The graph provides the obvious interpretation that there is minimum flow control at low pressure differentials and this is particularly true in the lowest 25% of the rated maximum flow. It is at these rates that "spin out" usually occurs. The variable orifice device, on the other hand, provides a high percentage of flow control in this low end.

The graph also illustrates that a conventional, fixed orifice, provides a high degree of, or precision control, at high flow and as the flow increases to a maximum. "Spin out" control is not essential at these high flow rates. Precision control of the flow, seldom, if ever, matches the actual flow volume required by the individual wheel motors and, in effect, the wheel motors "battle each other", the result being that only fifty percent efficiencies are common. The applicant's variable orifice concept allows relatively free flow at high volume where control is not critical. The result therefore, is increased efficiencies at high flow or high road speeds.

In conventional, fixed orifice controls, all flow is through a fixed orifice. This results in prohibitive, high flow pressure losses. This results in high heat generation which is, of course, representative of the loss. With the applicant's unit only moderate pressure losses occur at this high flow.

With the applicant's concepts, a variable pressure differential and flow responsive control is provided which gives the advantage of control of a vehicle at low speeds where such control is desired and often required.

What is claimed is:

1. A fluid control device for selectively dividing and combining fluid flow to and from at least a pair of independently driven members, such driven members being connected to one another through an exteral source, said control device including:
 a. a housing;
 b. a first passage formed in said housing to selectively receive and deliver fluid to and from said housing;
 c. a pair of passages formed in said housing to selectively receive and deliver fluid to and from said housing;
 d. an orifice passage formed in said housing and communicating with said first passage and providing a pair of orifices on respective sides of said first passage;
 e. a control spool passage formed in said housing and communicating with said pair of passages to receive and deliver fluid thereto and therefrom;
 f. a first pair of communicating passages formed in said housing permitting fluid flow between said orifice passage and said control spool passage, said communicating passages on the respective sides of said orifices such that flow therethrough is controlled by said orifices and communicating with said spool control passage in spaced relation to the ends of said passage;
 g. a second pair of communicating passages formed in said housing permitting fluid flow between said orifice passage and said control spool passage, said second communicating passages on the respective sides of said orifices such that flow therethrough is controlled by said orifices and communicating with said spool control passage adjacent the ends thereof;
 h. a third communicating passage formed in said housing permitting fluid flow from said first passage to said spool control passages, such communication with said spool control passage being intermediate said first pair of communicating passages;
 i. a pair of flow controlling spools slidably and sealingly arranged in said control spool passage, each of said spools having ends of a diameter to seal within said control spool passage and of a fluid passing diameter between said ends, a first of said ends controlling communication between one of said receiving and delivering passages and said first communicating passage when said spool is in a first position and the other of said ends controlling communication between one of said receiving and delivering passages and said first communicating passage when said spool is in a second position; and,
 j. pressure responsive valving members arranged in close association to each of said orifices and being shiftable in response to pressure and fluid flow through said first passage and said pair of passages.

2. The structure set forth in claim 1 and valve mounting means arranged in said orifice passage, said valving members being arranged in sliding relation thereon.

3. The structure set forth in claim 2 and spring means arranged on said valve mounting means to normally return said valving members to a first position within the area defined by said orifice.

4. The structure set forth in claim 2 and said valving members being of a size, with respect to said orifices to permit flow through said orifice when said valving members are within the area defined by said orifice.

5. The structure set forth in claim 2 and said valving members being provided with programmed and selectively controlled contours whereby the flow volume rate through said orifice is controlled and monitored as said valving members are shifted with respect to said orifices.

6. The structure set forth in claim 2 and spring means associated with said other ends of said spool valves to normally urge the same into face-to-face relation adjacent said third communicating passage when fluid is not being delivered to or received by said device.

* * * * *